US007321447B2

(12) United States Patent
Kuiper (10) Patent No.: US 7,321,447 B2
(45) Date of Patent: Jan. 22, 2008

(54) SYSTEM AND METHOD FOR PROCESSING A MULTI-COLOUR IMAGE

(75) Inventor: Paul Kuiper, Eindhoven (NL)

(73) Assignee: Oce-Technologies B.V., Venlo (NL)

( * ) Notice: Subject to any disclaimer, the term of this patent is extended or adjusted under 35 U.S.C. 154(b) by 933 days.

(21) Appl. No.: 10/730,118

(22) Filed: Dec. 9, 2003

(65) Prior Publication Data

US 2004/0114168 A1 Jun. 17, 2004

(30) Foreign Application Priority Data

Dec. 10, 2002 (EP) ............................ 02080674

(51) Int. Cl.
H04N 1/52 (2006.01)
H04N 1/58 (2006.01)
H04N 1/56 (2006.01)
B41M 1/14 (2006.01)

(52) U.S. Cl. ........................ 358/1.9; 358/535; 358/3.26; 358/540; 358/530; 347/15; 347/175; 347/176

(58) Field of Classification Search ................. 358/1.9, 358/2.99, 533, 535, 3.26, 540, 530, 454, 358/459; 347/15, 175–176, 41–43, 105; 428/32.33, 304.4
See application file for complete search history.

(56) References Cited

U.S. PATENT DOCUMENTS

| | | | | |
|---|---|---|---|---|
| 4,631,548 A | * | 12/1986 | Milbrandt | ................. 347/15 |
| 5,107,349 A | * | 4/1992 | Ng et al. | ................. 358/2.99 |
| 5,955,185 A | * | 9/1999 | Yoshino et al. | .......... 428/32.33 |
| 6,084,689 A | * | 7/2000 | Mo | ........................... 358/1.9 |
| 6,250,733 B1 | * | 6/2001 | Yao et al. | ..................... 347/15 |
| 6,906,736 B2 | * | 6/2005 | Bouchard et al. | .......... 347/176 |
| 2002/0057442 A1 | * | 5/2002 | Sawano et al. | ............. 358/1.9 |
| 2002/0113968 A1 | * | 8/2002 | Parisi et al. | ................ 356/399 |

FOREIGN PATENT DOCUMENTS

| | | |
|---|---|---|
| EP | 0 637 886 A2 | 8/1994 |
| EP | 0 774 860 A2 | 5/1997 |
| EP | 1 014 686 A | 6/2000 |
| WO | WO 02/05545 A1 | 1/2002 |

* cited by examiner

*Primary Examiner*—Kimberly Williams
*Assistant Examiner*—Charlotte M. Baker
(74) *Attorney, Agent, or Firm*—Birch, Stewart, Kolasch & Birch, LLP (57) ABSTRACT

A system and method are provided for processing digital multi-colour images for the reproduction thereof on a colour printing and/or copying system. Image dots of marking particles of the respective colours associated with the respective colour separation images are positioned contiguous to each other as long as the print area corresponding to the image part to be reproduced is not fully covered so as to create a first layer of marking particles. If the area is fully covered and the image is not yet completely rendered, a second and any following layer of contiguously positioned marking particles is formed on top of the first layer of image dots. The halftoning of the digital image is such that within the same layer all images dots, irrespective of their colour, are obtained using a raster of the same matrix structure, while image dots associated with different layers are obtained using rasters of different matrix structures.

20 Claims, 6 Drawing Sheets

Figur 4

Fig.5a

| 63 | 143 | 207 | 95 |
|---|---|---|---|
| 111 | 239 | 15 | 175 |
| 31 | 191 | 127 | 223 |
| 159 | 79 | 255 | 47 |

Fig.5b

| 223 | 175 | 31 | 111 |
|---|---|---|---|
| 79 | 127 | 255 | 159 |
| 191 | 15 | 95 | 47 |
| 143 | 63 | 207 | 239 |

Fig.5c

| K 220 | K 220 | Y 255 | Y 255 |
|---|---|---|---|
| K 220 | K 220 | Y 255 | M 200 Y 150 |
| Y 255 | Y 255 | M 200 Y 150 | M 200 Y 150 |
| Y 255 | M 200 Y 150 | M 200 Y 150 | M 200 Y 150 |

Fig.5d

| K 220 | K 220 | Y 255 | Y 255 |
|---|---|---|---|
| K 220 | K 220 | Y 255 | M 145 Y 110 |
| Y 255 | Y 255 | M 145 Y 110 | M 145 Y 110 |
| Y 255 | M 145 Y 110 | M 145 Y 110 | M 145 Y 110 |

Fig.5e

|  |  |  |  |
|---|---|---|---|
|  |  |  | M 55 Y 40 |
|  |  | M 55 Y 40 | M 55 Y 40 |
|  | M 55 Y 40 | M 55 Y 40 | M 55 Y 40 |

Fig.5f

| $K_1$ | $K_1$ | $Y_1$ | $Y_1$ |
|---|---|---|---|
| $K_1$ |  | $Y_1$ | $Y_1$ |
| $Y_1$ | $Y_1$ | $M_1$ | $Y_1 M_2$ |
| $Y_1$ | $M_1 Y_2$ | $Y_1$ | $M_1$ |

Figure 6

SYSTEM AND METHOD FOR PROCESSING A MULTI-COLOUR IMAGE

The present application claims, under 35 U.S.C. § 119, the priority benefit of European Patent Application No. 02080674.1 filed Dec. 10, 2002, the entire contents of which are herein fully incorporated by reference.

BACKGROUND OF THE INVENTION

1. Field of the Invention

The present invention is related to the processing of multi-colour images for reproduction on a printing or copying system. Particularly of interest are systems for forming images composed of a plurality of colour separation images on an image-receiving member wherein the marking particles of the respective colours associated with the respective colour separation images are positioned in superimposed relationship.

2. Discussion of the Related Art

Marking particles of a limited number of colours, being the process colours, are available on each multi-colour printing system to render a colour image. In digital colour printing, continuous tones are rendered by halftoning the separation images in the process colours. The process colours are a limited number of colours of marking particles available on each multi-colour printing system to render a colour image. Usually a distinction can be made between these colour printing systems based on the kind of marking particles used, e.g. ink or toner, the imaging process employed, e.g. magnetography, or electro(photo)graphy, or inkjet, the productivity or the media range. A distinction can, however, also be made dependent on how the multi-colour image of marking particles is composed. In the majority of commercially available digital multi-colour printing systems, the multi-colour image of marking particles is composed of a plurality of registered colour separation images of marking particles, where the image dots of marking particles of the respective process colours associated with the respective colour separation images are superimposed and as such form a layered structure of marking particles. The marking particles pile height depends on the marking particle size, the halftoning and the number of process colours available, and varies with image density.

In a first halftoning approach, the colour separation image of each process colour is halftoned using a different screen for each separation image. The amount of overlap between image dots of different process colours depends on the image density and the pixel filling in sequence associated with the respective screens. A disadvantage of this approach employing a plurality of different screens is its sensitivity for creating Moiré patterns. Moiré patterns are visible distortions in a rendered multi-colour image caused by interference patterns generated by combining halftone screens. Although it is known that the visible effect of Moiré patterns can be reduced by angling the halftone screens using predetermined screen angles, avoiding Moiré becomes particularly troublesome in colour printers where four or more process colours can be rendered. Therefore using a different screen for each process colour is not an option when more than four process colours are available on the colour printer to render a multi-colour image.

In a second halftoning approach, the same screen is used for each process colour. This approach yields maximum overlap between image dots of the respective colours and by consequence minimal area coverage. Particularly at low image densities, the images rendered according to this second approach are highly sensitive to graininess. Graininess is a perceived feature of a rendered colour which is related to how uniformly the coloured marking particles have been developed on the image receiving member.

The above-mentioned approaches have some further inherent disadvantages. Firstly, because the marking particles of the different process colours are superimposed, the total marking particles pile height can be high, particularly in full colour high density image parts. Particularly in case the marking particles are toner particles, as the size of toner particles is typically in the micrometer range, this may limit the amount of process colours which may be used to render an image as an increased number of process colours also may increase the maximum marking particles pile height. Besides the fact that a high total marking particles pile height is noticeable to the customer both visually and palpably, this may also negatively influence medium curl and transport as well as reduce the resistance against external mechanical influences such as scratches and folding. Moreover, different image compositions, e.g. different density and/or colour composition, may lead to topographic differences on the image-receiving member which reinforce some of the above mentioned disadvantages and reveal additional disadvantages, such as gloss differences between different image parts.

U.S. Pat. No. 6,250,733 discloses a halftoning method employing a single screen for all colours wherein at low image density levels, pixels are rendered by positioning image dots of the respective colours contiguous to each other instead of superimposed. This image dot-off-dot approach is advantageous with respect to graininess. U.S. Pat. No. 6,250,733 further discloses that when the sum of the image density levels of the pixels of an image part exceeds the threshold corresponding to an ink area coverage of 100%, the remaining image density levels are rendered by superimposing image dots in a second layer of ink employing the same screen. However, when this second layer of ink is applied, care is taken not to impose an ink dot of the second layer on an ink dot of the first layer of the same colour. In order to enable this, once it is established that an image part has a sum of image density levels exceeding the threshold of 100% ink area coverage and thus image dots of a second layer need to be formed, the image data associated with the process colours are reconfigured such as to associate the image data with virtual colours. These virtual colours are realized by a combination of two process colours. Such a combination of process colours is realized by imposing two process colours onto each other in two layers, however, using the same screen. Using the same screen for both layers may cause undesired interference patterns, e.g., patterns caused by registering errors.

SUMMARY OF THE INVENTION

It is an object of the invention to provide a system and method for processing digital multi-colour images for the reproduction thereof on a colour image reproduction system capable of forming registered composite multi-colour images of coloured marking particles on an image-receiving member. The digital multi-colour images should be processed such that during reproduction thereof, interference patterns are avoided while limiting graininess.

It is a further object of the present invention to provide a system and method for processing digital multi-colour images for the reproduction thereof on a colour image reproduction system capable of producing full-colour images with a limited marking particles pile height.

It is still a further object of the present invention to provide a system and method for processing digital multi-colour images for the reproduction thereof on a colour image reproduction system capable of rendering images without imposing a limitation on the number of process colours.

According to the present invention, the multi-colour image of marking particles generated by a colour image reproduction system may be composed of a plurality of registered colour separation images where the marking particles of the respective colours associated with the respective colour separation images are positioned contiguous to each other as long as the print area corresponding to the image part to be reproduced is not fully covered such as to create a first layer of marking particles. If the area is fully covered and the image is not yet completed, a second and any following layer of contiguously positioned marking particles is formed on top of the first layer of image dots. This dot-off-dot approach has the advantage of a limited graininess and a limited marking particles pile height, and imposes no limitation on the number of process colours. The process colours can be any colour available in the system such as e.g. black, white, cyan, magenta, yellow, red, green, blue, orange, pink, and include light, medium or dark versions of the afore-mentioned process colours.

In particular, in a first aspect of the invention, a method is disclosed for image processing a digital multi-colour image and includes the steps of: generating from the digital multi-colour image image signals for a selection of process colours, each image signal being associated with a digital separation image of a process colour of the selection of process colours and specifying for each pixel of the digital multi-colour image an image density value for the associated process colour; and adding up for each image part of the digital multi-colour image the image density values of all the process colours of the pixels of the image part in order to determine for each image part a total area coverage value, CT. If the total area coverage value of an image part exceeds 100%, the method further comprises the following steps: a) dividing image density values of pixels of the image part specified by the image signals in first image density values associated with a first layer of image dots of marking particles and at least second image density values associated with a second and any following layer of image dots of marking particles such that the sum of the at least second image density values corresponds to an area coverage value equal to CT-100%; and b) converting the image signals by using a matrix-dither technique into corresponding first printing signals and at least corresponding second printing signals, each printing signal indicating for each pixel of the image part whether an image dot of marking particles of the corresponding process colour is to be formed, the matrix-dither technique being such that each of the first printing signals is built up from a raster of a first two-dimensional matrix structure by thresholding the first image density values, while each of the second printing signals is built up from a raster of a second two-dimensional matrix structure, different from the first two-dimensional matrix structure, by thresholding the second image density values. As the raster associated with the first layer is different from the raster(s) associated with the second and any following layer, the formation of undesired interference patterns can be limited.

The image processing system may be incorporated in a computer which can be coupled by a network or any other interface to one or more image reproduction systems, such as printing and/or copying systems. The image processing system may also be part of a colour image reproduction system. The image processing system may also be part of a colour scanner provided the colour scanner can be coupled by a network or any other interface to a colour image reproduction system.

In an embodiment of the invention, at least two process colours have non-zero second image density values. In the latter case, the method may further comprise the steps of determining a first area coverage fraction of a first process colour of the at least two process colours based on the associated first image density values, and a second area coverage fraction of the first process colour based on the associated second image density values, and a first area coverage fraction of a second process colour of the at least two process colours based on the associated first image density values, and a second area coverage fraction of the second process colour based on the associated second image density values, wherein the dividing is such that the ratio between the first area coverage fraction of the first process colour and the first area coverage fraction of the second process colour differs less than 5% from the ratio between the second area coverage fraction of the first process colour and the second area coverage fraction of the second process colour. Minimizing the variation from layer to layer of the ratios between the area coverage fractions values of at least two process colours has a beneficial effect on the colour balance of the reproduced image.

In another aspect of the invention, an image processing system is disclosed for processing a digital multi-colour image and includes: a generation module for generating from the digital multi-colour image image, signals for a selection of process colours, each image signal being associated with a digital separation image of a process colour of the selection of process colours and specifying for each pixel of the digital multi-colour image an image density value for the associated process colour; an analysis module for adding up for each image part of the digital multi-colour image the image density values of all the process colours of the pixels of the image part in order to determine for each the image part a total area coverage value, CT, and, if the total area coverage value of an image part exceeds 100%, for dividing image density values of pixels of the image part specified by the image signals in first image density values associated with a first layer of image dots of marking particles and at least second image density values associated with a second and any following layer of image dots of marking particles such that the sum of the at least second image density values corresponds to an area coverage value equal to CT-100%; and a conversion module for converting, if CT exceeds 100%, the image signals by using a matrix-dither technique into corresponding first printing signals and at least corresponding second printing signals, each printing signal indicating for each pixel of the image part whether an image dot of marking particles of the corresponding process colour is to be formed, the matrix-dither technique being such that each of the first printing signals is built up from a raster of a first two-dimensional matrix structure by thresholding the first image density values, while each of the second printing signals is built up from a raster of a second two-dimensional matrix structure, different from the first two-dimensional matrix structure, by thresholding the second image density values.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

Hereinafter, reference will be made to multi-colour printing systems only, although the present invention is equally applicable to digital multi-colour printing and/or copying systems. In this disclosure, colour means all colours including black and white and all shades of grey. In relation to the appended drawings, the present invention is described in detail in the sequel. Several embodiments are disclosed. It is apparent, however, that a person skilled in the art can imagine other equivalent embodiments or other ways of executing the present invention, the scope of the present invention being limited only by the terms of the appended claims.

Figure 1:
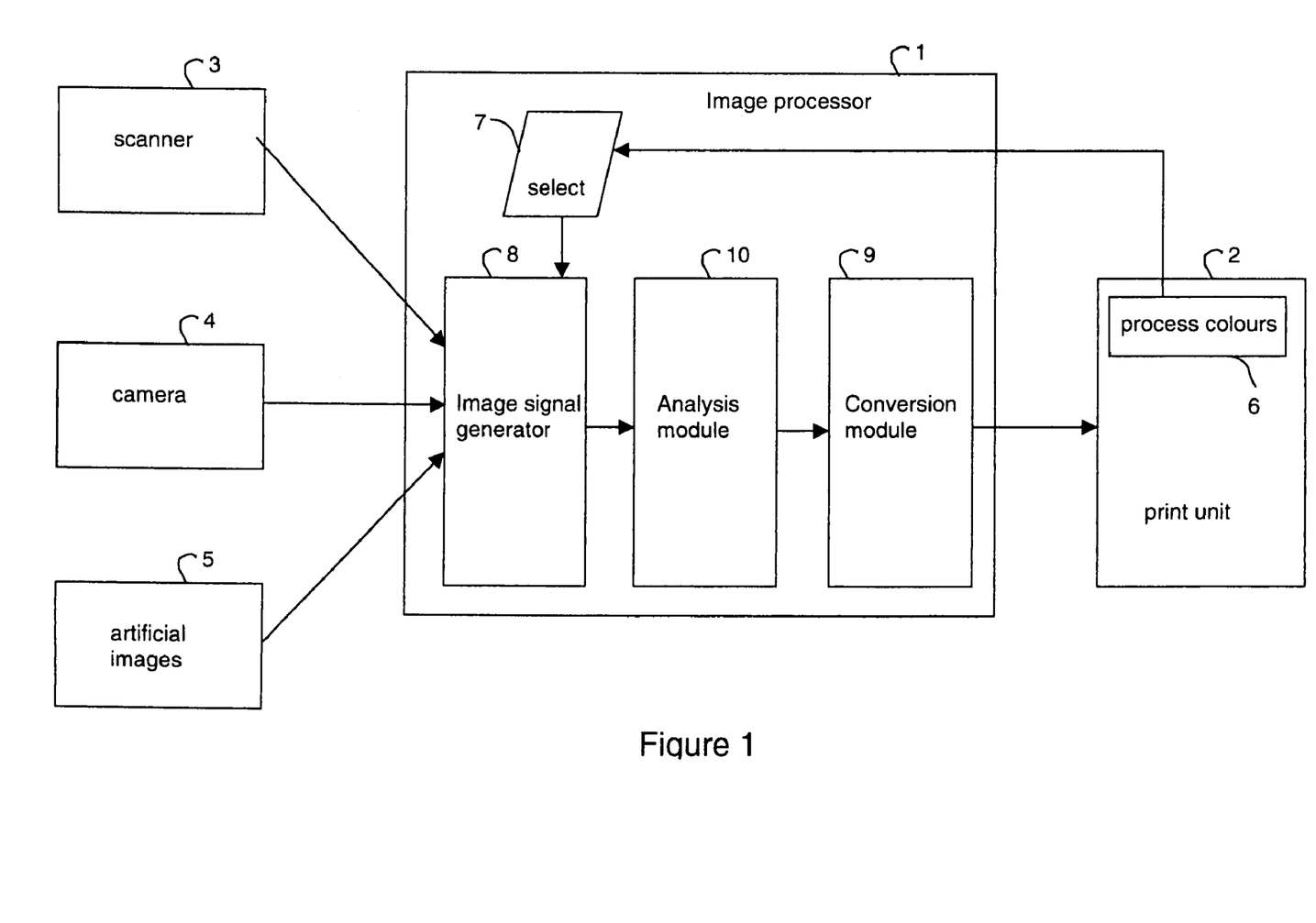
FIG. 1 depicts a schematic representation of a colour image reproduction system according to the present invention.

According to a preferred embodiment of the invention, a digital image reproduction system, i.e. a colour printing and/or copying system, as depicted in FIG. 1 comprises an image processing system (1) and a printing unit (2). A digital multi-colour image may be offered to the digital image reproduction system for reproduction thereof. There are numerous ways to generate a digital image. For instance, a digital image may be generated by scanning an original document or image using a scanner (3). The scanner (3) can be part of the digital image reproduction system or may be coupled via a network or any other interface to the digital image reproduction system. Digital still images may also be generated by a camera or a video camera (4) which may be coupled via a network or any other interface, e.g. an IEEE1394 interface, to the digital image reproduction system. Besides digital images generated by a scanner or a camera, which are usually in a bitmap format or a compressed bitmap format also artificially created, e.g. by a computer program, digital images or documents (5) may be offered to the digital image reproduction system. The latter images are usually in a structured format including but not limited to a page description language (PDL) format and an extensible markup language (XML) format. Examples of a PDL format are PDF (Adobe), PostScript (Adobe), and PCL (Hewlett-Packard). All the components of the digital image reproduction system are operatively coupled.

Regardless of the origin of the digital image, one may opt to store the digital image in a memory such that it can be easily retrieved by the image processing system either directly or via any interface.

The image signal generator (8) of the image processing system (1) generates a sequence of image signals for a selection of process colours (7). The process colours (6) correspond to the colours of the marking particles available in the printing unit (2). Examples of process colours include, but are not limited to, black, white, cyan, magenta, yellow, red, green, blue, pink, orange and include light, medium or dark versions of the afore-mentioned process colours. Any selection of process colours may be made. For instance, a selection of a process colour may be made dependent on the colour gamut required to adequately reproduce the digital image and/or the desired quality level. Each image signal has a one-to-one relationship with a separation image of a particular process colour of the selection. The image signal specifies for each pixel of the digital image at least an image density value for the associated process colour. The image density value is typically an 8-bit value, which enables the use of 256 grey levels per process colour.

The analysis module (10) of the image processing system (1) adds up for each image, part of the digital image the image density values of all the selected process colours of all the pixels of the image part. The resulting number is then used to determine the total area coverage value, CT, i.e. the area on the image-receiving member which would be required for rendering the total image part, when positioning the image dots of marking particles contiguous to each other, i.e. without overlap, relative to the area of the image part. Image magnification, when applicable, is corrected for when determining CT.

The conversion module (9) of the image processing system (1) converts the image signals by means of a halftone technique according to the present invention and as explained in more detail further in the description, into printing signals. Each printing signal indicates for each pixel whether an image dot of marking particles of the corresponding process colour is to be formed. This indication may be done using a single bit or multi-bit value dependent on the halftoning capabilities of the printing unit. If the printing unit is capable of multi-level halftoning, a multi-bit value may be used, where the number of bits relates to the number of grey levels which can be reproduced per pixel by the printing unit. Usually the printing unit is only capable of binary halftoning or in other words a single bit value, i.e. "0" or "1", indicating whether an image dot is to be formed or not. In the remainder of this description, reference is made only to a printing unit capable only of binary halftoning. It is clear, however, that this invention is equally applicable to printer units capable of multi-level halftoning.

A number of process colours (6) are available on the printing unit (2). Responsive to a sequence of printing signals, the printing unit (2) forms the respective separation images of marking particles of the corresponding process colour on the image-receiving member. The printing unit (2) is such that the image dots of marking particles associated with the respective colour separation images are positioned contiguous to each other till the full area coverage is reached, thereby forming a first layer of marking particles. If the image part is such that CT>100%, a second and any following layer are formed on the first layer using for at least two process colours the same area coverage ratios within each layer. When forming a layer of marking particles, a subsequent layer is only formed when reaching the full area coverage. The image-receiving member can be a print medium or an intermediate member. The medium can be in web or sheet form and may be composed of e.g. paper, cardboard, label stock, plastic or textile. The intermediate member may be an endless member, such as a belt or drum, which can be moved cyclically.

Figure 2:
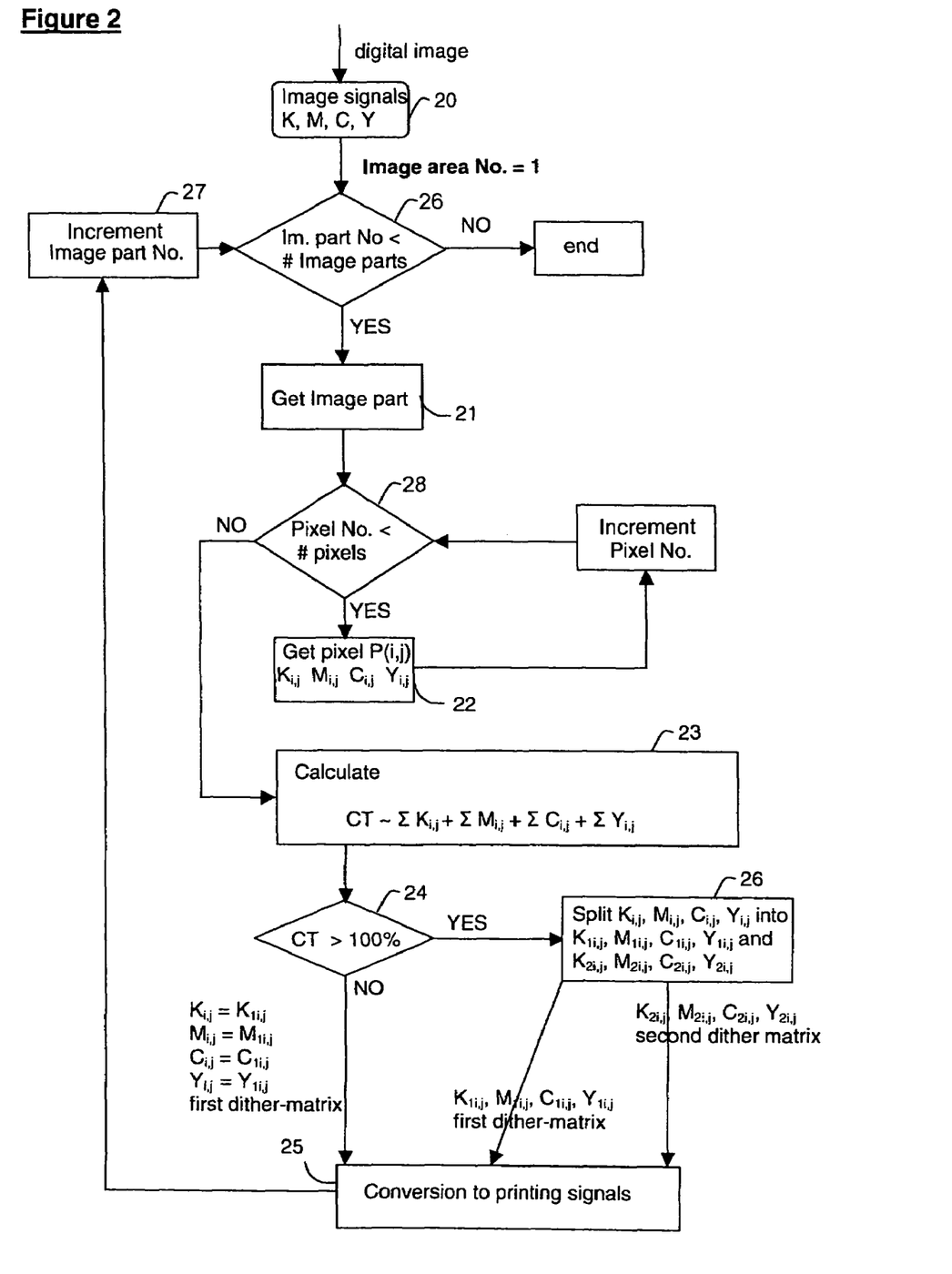
FIG. 2 depicts, according to an embodiment of the present invention, a schematic process flow of the image processing steps performed on the image signals associated with a digital image including the actual conversion of the image signals into printing signals.

When operating an image processing unit according to an embodiment of the present invention as represented in the process flow of FIG. 2, a digital image is offered to the image signal generator (8). The image signal generator (8) generates image signals (20) for a selection of process colours, each image signal being associated with a digital separation image of a process colour of the selection and specifying for each pixel of the digital image an image density value for the associated process colour. The selected process colours are cyan (C), magenta (M), yellow (Y) and black (K). A first image part (21) is selected. The size of the image part (21) may range from the size of a single pixel to the size of a complete image. For each pixel P(i,j) of the image part, the associated image density values for the selection of process colours are retrieved (28, 22, 29) and are represented as $Y_{i,j}$, $M_{i,j}$, $C_{i,j}$, $K_{i,j}$. The image density values of all the pixels of the selected image part are added (23) in order to determine the total area coverage value, CT. For instance, for the selected image part, CT [%] may be determined as follows:

$$CT = \frac{\left(\sum Y_{ij} + \sum C_{ij} + \sum M_{ij} + \sum K_{ij}\right)/\#\text{pixels}}{T_{MAX}} \times 100$$

where $T_{MAX}$ is the maximum threshold value of the matrix structure.

Subsequently it is determined whether the selected image part can be rendered using a single layer of image dots of marking particles by comparing (24) the CT value with the full area coverage value of 100%. If the CT value is equal to or smaller than 100%, a single layer of image dots of marking particles of the respective process colours suffices to render the selected image part. In this case, as further explained in this description with reference to FIG. 3, the image signals are converted (25) to printing signals employing the same halftone screen for each of the process colours. A halftone screen is a raster composed of a repetitive two-dimensional matrix structure including threshold values, i.e. a dither-matrix. The threshold values may be arranged in a predetermined order. Alternately, the threshold values may be arranged randomly, i.e. a so-called stochastic dither-matrix. Each printing signal is built up from the raster of the same two-dimensional matrix structure by analyzing the image density value of the associated process colour of each pixel in relation to the corresponding threshold value of the raster. The print signals may be forwarded to a printing unit where, subject to registering errors, a registered multi-colour image of dot-off-dot printed marking particles is formed on an image-receiving member.

Alternatively, if the CT value exceeds 100% (24), a single layer of image dots of marking particles is not sufficient to render the complete image part. Dependent on the CT value, at least a second layer and possible subsequent layers of marking particles of image dots may be required to render the complete image part. In case 100%<CT≦200%, as also assumed in FIG. 2, two layers are sufficient. The image density values associated with the respective process colours, $Y_{i,j}$, $M_{i,j}$, $C_{i,j}$, $K_{i,j}$, are split (26), as explained further with reference to FIG. 4, into first image density values, $Y_{1i,j}$, $M_{1i,j}$, $C_{1i,j}$, $K_{1i,j}$, and second image density values, $Y_{2i,j}$, $M_{2i,j}$, $C_{2i,j}$, $K_{2i,j}$. The first image density values are used to generate (25) a first sequence of printing signals for rendering a first full coverage layer of image dots of marking particles employing the same first halftone screen. The second image density values are used to generate (25) a second sequence of printing signals for rendering a second layer of image dots of marking particles employing the same second halftone screen different from the first halftone screen. The first and second sequence of printing signals may be forwarded to a printing unit. The printing unit forms, subject to registering errors, a first layer of dot-off-dot printed marking particles of the process colours associated with the first sequence on an image-receiving member using the first sequence of printing signals, and a second layer of dot-off-dot printed marking particles of the process colours associated with the second sequence on the first layer.

The above process in FIG. 2 is repeated for each of the image parts (27, 26).

Figure 3:
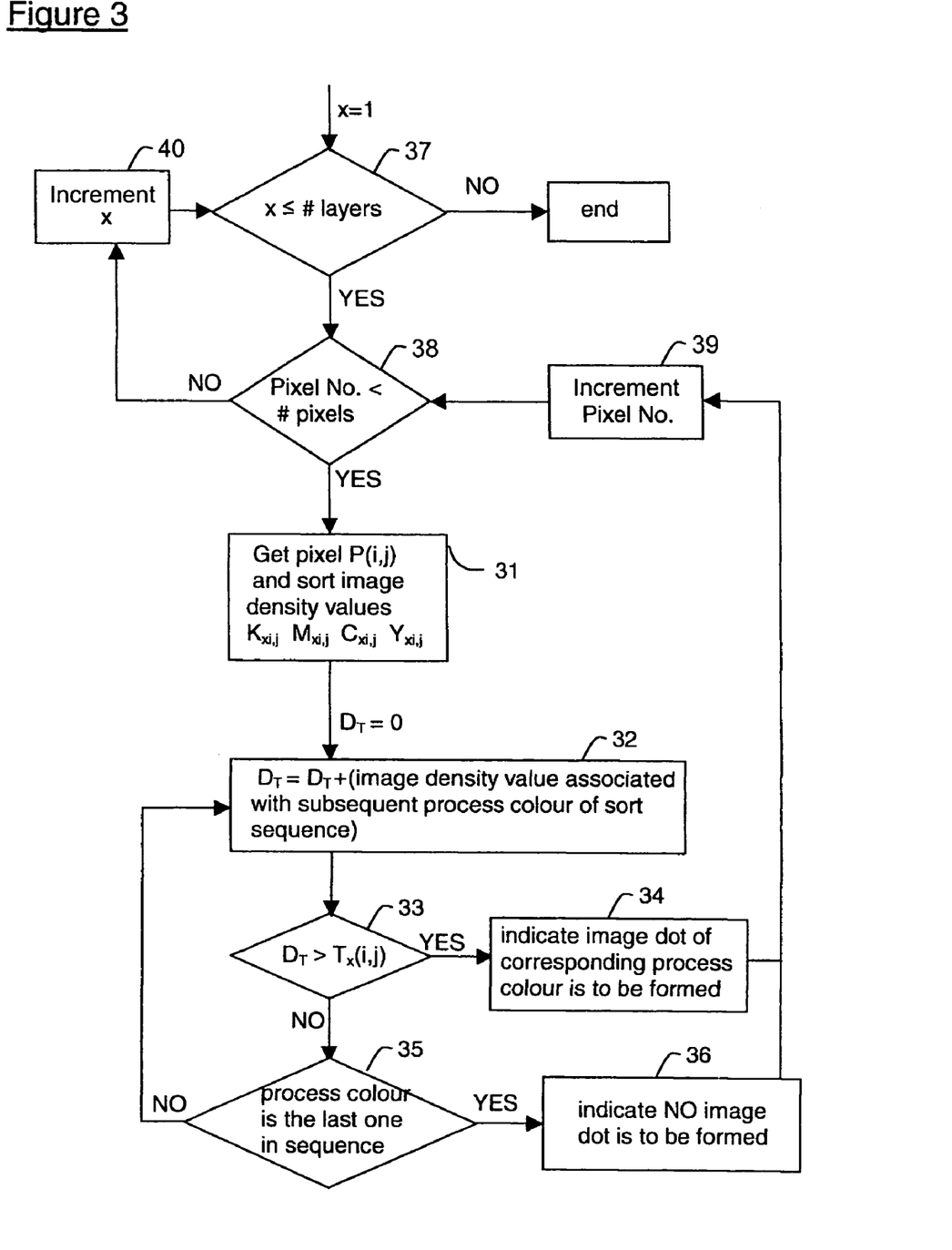
FIG. 3 depicts, according to an embodiment of the present invention, a more detailed process flow of the conversion to printing signals step (25) of FIG. 2.

FIG. 3 is a flow diagram of an implementation of how the image signals associated with an image part of the digital image can be converted into printing signals (step 25 in FIG. 2). At the start of the conversion, the area coverage value of the image part and thus also the number of layers required to render the image part is known. For each layer, the associated image density values for each pixel of the digital image are inputted in the conversion routine (37, 38, 39, 40). Starting with the first pixel of the image part, the image density values associated with this pixel and required to generate the corresponding layer are retrieved and sorted (31) according to a predetermined sequence of process colours. The sort sequence may be such that the process colours are ordered with the decreasing contrast value. The image signal associated with the process colour with the highest contrast value is converted first. In this case, black (K) is converted first followed by magenta (M), cyan (C), and finally yellow (Y). The human eye is the most sensitive for the process colours with the highest contrast. Although the invention is in no way limited to the ordering of the process colours with the decreasing contrast, such ordering is particularly beneficial when halftoning employing a stochastic dither-matrix as stochastic dither-matrices result in the best distribution of rendered pixels for the low image density values.

After the image density values associated with the pixel are sorted, it is determined whether an image dot of marking particles is to be formed and if so, it is determined which process colour is to be used. This can be done as follows. An overall image density value for the pixel, $D_T$, is defined (32). At start, $D_T$ equals the image density value associated with the first process colour in the sequence of process colours. As this is black, $D_T = K_{x\ i,j}$. Each layer has an associated raster composed of a repetitive pattern of a two-dimensional matrix structure. Within each layer, the same raster is used for each process colour. $D_T$ is compared (33) with the corresponding threshold value of the associated raster, $T_{x\ i,j}$. When the value of $D_T$ exceeds this threshold value, it is indicated that an image dot of marking particles of the corresponding colour, in casu black, is to be formed. When the value of $D_T$ is equal to or smaller than this threshold value, it is determined whether the process colour is the last one in the sequence (35). As the process colour is black, this is not yet the case. Therefore the process returns to step 32 and the image density value associated with the subsequent process colour (magenta) is added to previous $D_T$ to obtain current $D_T$ (32). Then again $D_T$ is compared (33) with the same corresponding threshold value of the associated raster. When the value of $D_T$ exceeds this threshold value, it is indicated that an image dot of marking particles of the corresponding colour, in casu magenta, is to be formed, when not the image density value of the subsequent process colour, cyan, is added to $D_T$. This sequence of steps is repeated till either it is indicated that an image dot of the corresponding colour is to be formed (34) or the last process colour in the sequence is reached (35) without having exceeded the threshold value. In the latter case it is indicated (36) that no image dot of marking particles is to be formed. After it is indicated whether an image dot is to be formed or not, the image density values associated with the next pixel, if any, are retrieved (39, 38, 31). When this is repeated for all pixels of the image part, the whole sequence is reiterated for each subsequent layer (38, 40, 37), if any, till the complete image part is converted into printing signals.

Figure 4:
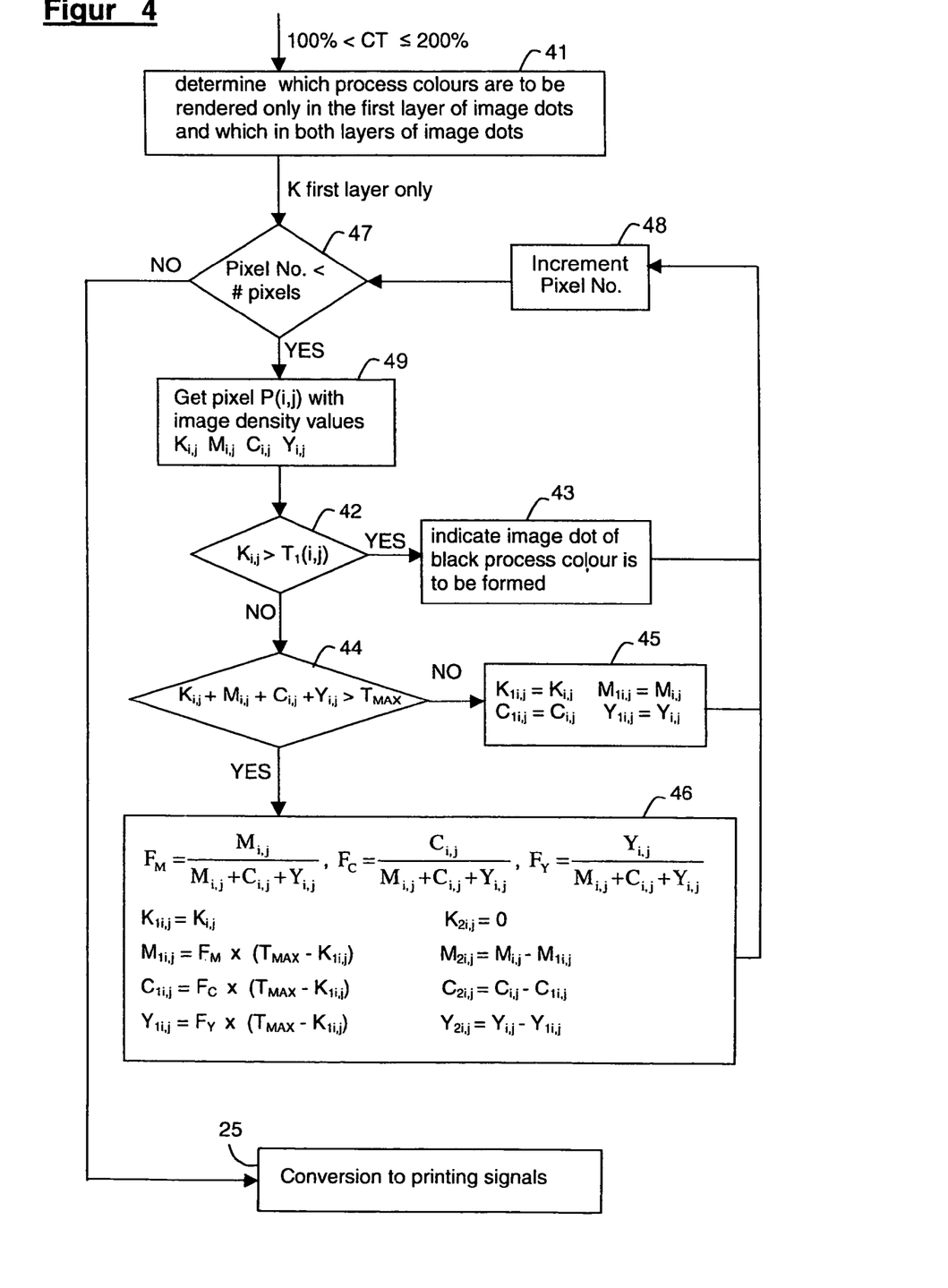
FIG. 4 depicts, according to an embodiment of the present invention, a more detailed process flow of the splitting step (26) of FIG. 2 wherein the image density values associated with a pixel of the digital image may be split into first and second image density values.

Further according to an embodiment of the present invention, FIG. 4 shows an implementation of how the image signals associated with an image part are split (step 26 of FIG. 2) in order to enable a conversion to printing signals for forming multiple layers of image dots of marking particles dependent on the value of CT. According to the present invention, in order to have a beneficial effect on the colour balance of the reproduced image, it is aimed to perform the halftoning such that the variation from layer to layer of the ratios between the area coverage fractions values of at least two process colours is minimized. In FIG. 4 it is assumed that 100%<CT≦200%, as also assumed in FIG. 2, and therefore the image signals are split in order to generate two layers of image dots. This may be done as follows.

Firstly, it is determined which process colours are to be rendered only in the first layer of image dots and which in both layers (41). In the implementation as of FIG. 4, the black colour is rendered only in the first layer, while magenta, cyan and yellow are split between both layers. Rendering the process colour with the highest contrast value in the first layer only may have a beneficial effect on the colour balance of the reproduced image. For each pixel, it is determined whether solely a black image dot is to be formed. This is done by comparing (42) the associated image density value (49) with the corresponding threshold value of the first dither matrix structure. When the image density value exceeds the threshold value, it is indicated that an image dot of the black process colour is to be formed (43). Subsequently, the next pixel of the image part is processed (48, 47).

In case the image density value does not exceed the threshold value (42), it is determined whether the sum $(K_{i,j}+M_{i,j}+C_{i,j}+Y_{i,j})$ of image density values associated with the pixel exceeds $T_{MAX}$ (44). $T_{MAX}$ is the maximum threshold value of the first dither matrix. In case the sum of image density values associated with the pixel does not exceed the maximum threshold value, it will be determined whether an image dot of marking particles of the first layer is to be formed. This evaluation will be performed for the first layer only by converting (25) the image signals associated with the pixel (45) in print signals using the first dither mask as e.g. in FIG. 3.

In case the sum of image density values associated with the pixel does exceed the maximum threshold value (44), pixel area coverage fraction values for magenta, cyan and yellow, i.e. the process colours which are both rendered in the first and the second layer, are calculated (46). Subsequently, the associated image density values are divided (46) into first image density values $(K_{1i,j}, M_{1i,j}, C_{1i,j}, Y_{1i,j})$, i.e. image density values associated with the first layer, and second image density values $(K_{2i,j}, M_{2i,j}, C_{2i,j}, Y_{2i,j})$, i.e. image density values associated with the second layer. Both the first and the second image density values for magenta, cyan and yellow are calculated such that ratios between the area coverage fractions of magenta, cyan and yellow are about the same within both layers. Once this calculation is performed for all pixels of the image part (48, 47), the image signals associated with the first image density values are converted in a first sequence of printing signals (25) for rendering the first layer of image dots of marking particles, while the image signals associated with the second image density values are converted in a second sequence of printing signals (25) for rendering the second layer of image dots of marking particles.

EXAMPLE

With reference to the drawings, by means of an example it will be described how a digital multi-colour image can be reproduced employing a halftoning technique according to an embodiment of the present invention. Suppose for instance that an original multi-colour image is scanned at a resolution of 600 dpi×600 dpi resulting in a digital multi-colour image being composed of three separation images respectively of the colours red (R), green (G) and blue (B). The image signals associated with the respective separation images specify for each pixel of the respective colour an image density value using an 8-bit representation. An 8-bit representation enables to define 256 levels each corresponding with a particular tonal value. This digital multi-colour image is forwarded to a digital colour printing system. Suppose a selection of 4 process colours is made being black (K), cyan (C), magenta (M) and yellow (Y). The image signal generation module (such as 8 in FIG. 1) of the image processor converts the three image signals associated with the separation images of the RGB colours into four image signals associated with the separation images of the selected process colours, being CMYK. Known colour management techniques may be used in order to render the colours of the original adequately. When appropriate, with known techniques may be adapted during the conversion preferably such that the pixel size of the separation images of the process colours matches the image dot size of the printing unit. In this example, the pixel size of the scanned image, being about 42 µm×42 µm or an image resolution of 600 dpi×600 dpi, corresponds to the minimal pixel size which can be rendered by the printing unit (such as 2 in FIG. 1), as the printing unit is capable of printing with a resolution of 600 dpi×600 dpi.

A printing signal associated with a separation image of a process colour is generated by comparing for each pixel the image density value of the associated process colour with a threshold value in a corresponding cell of the raster. The raster is a repetitive pattern of a matrix structure. The size of each cell of the matrix corresponds to the minimum image dot size which can be rendered by the printing unit. An arbitrary example of such a matrix structure, having 16 cells, is described in FIG. 5*a*. In practice, usually larger matrices are used allowing more tonal values. Any distribution of threshold values between the minimum and maximum image density may be selected.

The threshold values may be arranged in a predetermined order or randomly.

Figure 5A:
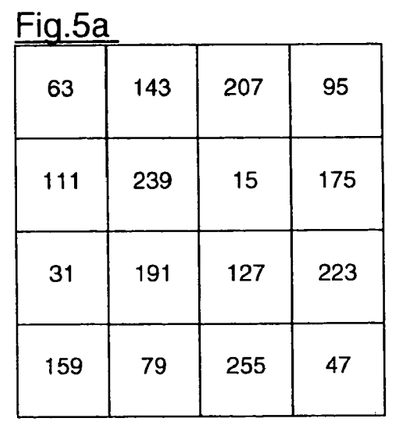
FIG. 5a depicts an example of a raster of a single matrix structure including threshold values used for halftoning the digital image of FIG. 5c by comparing the first image density values of FIG. 5d with the corresponding threshold values.
Figure 5B:
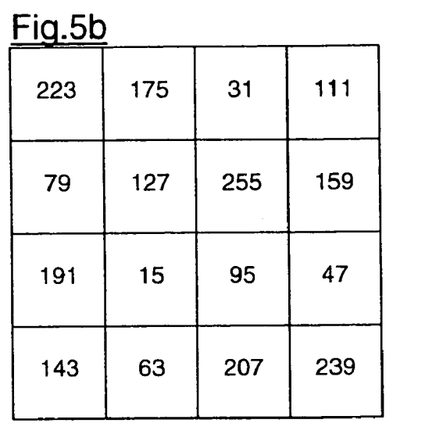
FIG. 5b depicts an example of a raster of a single matrix structure including threshold values used for halftoning the digital image of FIG. 5c by comparing the second image density values of FIG. 5e with the corresponding threshold values.
Figure 5C:
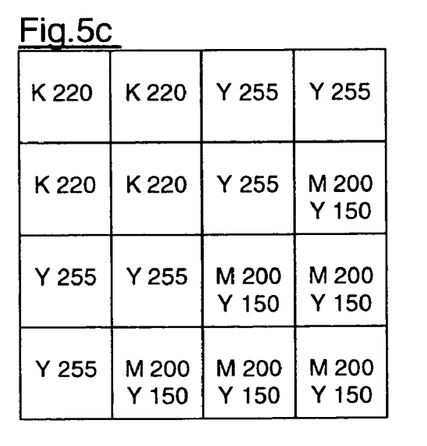
FIG. 5c depicts a pixelised representation of digital multi-colour image including image density values for each pixel.

Suppose further by means of example that a digital image (see FIG. 5*c*) is processed having an area of the same size as the raster of a single matrix structure as in FIG. 5*a* and that the image parts thereof correspond with pixels. The maximum threshold value of the first dither matrix (FIG. 5*a*) is 255. The total area coverage value (CT) of an image part, in casu a pixel, is based on the value obtained by adding up the image density values of the respective process colours. CT exceeds 100% coverage if this sum of image density values exceeds 255. The first image part of the digital image is a pixel having a non-zero image density value for the black colour only, being 240 (upper left corner of FIG. 5*c*). Therefore the CT value is clearly below 100% coverage. This means, when using the process flow of FIG. 3, that the number of layers equals 1.

Figure 5D:
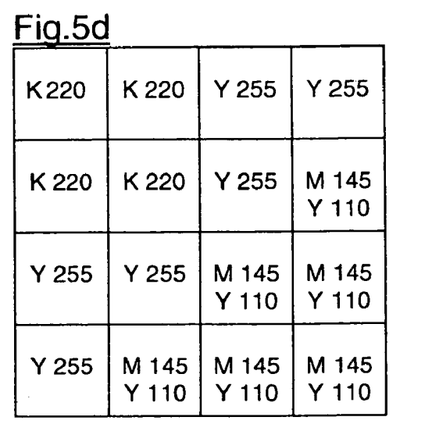
FIG. 5d depicts the digital multi-colour image of FIG. 5c including only first image density values for each pixel obtained by splitting the image density values of FIG. 5c according to an embodiment of the present invention.

In this example, the sort sequence (31 in FIG. 3) of the process colours for each pixel of the image is the same, being K, M, C, and finally Y. At start, $D_T$ equals the image density value associated with the first process colour in the sequence of process colours. As this is black, $D_T$=240. The raster associated with the first layer is the raster of FIG. 5*a*. $D_T$ is compared (33 in FIG. 3) with the corresponding threshold value of the associated raster being 63 As the value of $D_T$ exceeds this threshold value, it is indicated that an image dot of marking particles of the corresponding colour, in casu black, is formed. This is visualised in FIG. 5*f* (upper left corner). This sequence of steps is repeated for the subsequent pixels. Within each layer, the same raster is used for each process colour. An empty cell in FIG. 5*f* indicates that no image dot is formed. The fourth pixel of the second row in FIG. 5*c* has an associated image density value for the magenta colour of 200 and for the yellow colour of 150. Adding up these values yields a value of 350 which clearly exceeds the maximum threshold value of 255 or in other words, CT exceeds 100% (24 in FIG. 3).

Figure 5E:
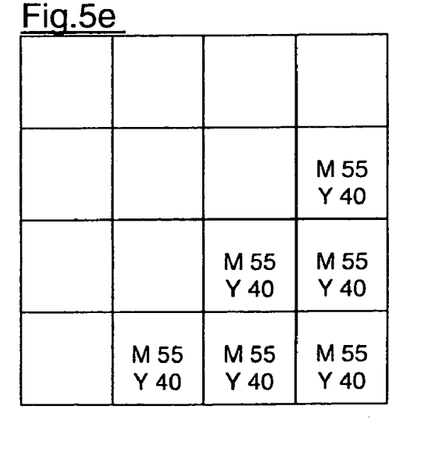
FIG. 5e depicts the digital multi-colour image of FIG. 5c including only second image density values for each pixel obtained by splitting the image density values of FIG. 5c according to an embodiment of the present invention.
Figure 5F:
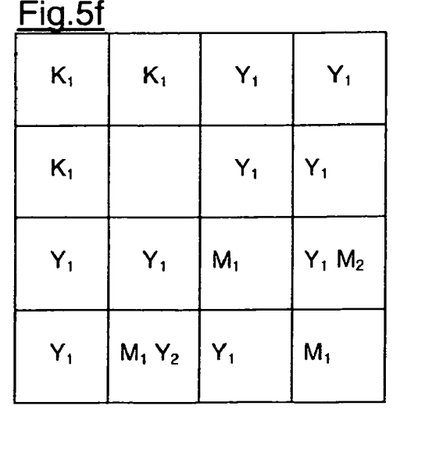
FIG. 5f depicts a pixelised representation of a reproduction of the multi-colour image of FIG. 5c according to an embodiment of the present invention. The process colours with subscription 1 are image dots formed in a first layer, and the process colours with subscription 2 are image dots formed in a second layer.

The image density values of the respective process colours $M_{i,j}$, $Y_{i,j}$ associated with the pixel are split (26 in FIG. 2), as explained further with reference to FIG. 4, into first image density values $M_{1i,j}$, $Y_{1i,j}$ (FIG. 5*d*) and second image density values $M_{2i,j}$, $Y_{2i,j}$ (FIG. 5*e*). As $M_{i,j}+Y_{i,j}>255$ (44 in FIG. 4), one can calculate (46 in FIG. 4) the first image density values $M_{1i,j}=0.57\times255=145$, $Y_{1i,j}=0.43\times255=110$ and the second image density values $M_{2i,j}=200-145=55$, $Y_{2i,j}=150-110=40$. For the conversion into printing signal, again the process flow of FIG. 3 is used. For the first layer, at start, $D_T$ equals the image density value associated with the first process colour in the sequence of process colours. Here, this is black, $D_T$=0. The raster associated with the first layer is the raster of FIG. 5*a*. $D_T$ is compared (33 in FIG. 3) with the corresponding threshold value of the associated raster being 175. As the value of $D_T$ is smaller than this threshold value, it is determined whether the process colour is the last one in the sequence (35 in FIG. 3). As the process colour is black, this is not yet the case. Therefore the image density value associated with the subsequent process colour (magenta) is added to $D_T$ (32 in FIG. 3). Again $D_T$, which now equals 145, is compared (33 in FIG. 3) with the same corresponding threshold value of the associated raster, being 175. Still the value of $D_T$ does not exceed this threshold value. Therefore also the value for the yellow process colour, being 110, is added to $D_T$, which then clearly exceeds the threshold value. Consequently, as also indicated in FIG. 5*e*, a yellow image dot is formed in the first layer. For the second layer, the first non zero value of $D_T$ equals the image density value associated with the magenta process colour, being 55. The raster associated with the second layer is the raster of FIG. 5*b*. $D_T$ is compared (33 in FIG. 3) with the corresponding threshold value of the associated raster being 159. As the value of $D_T$ is smaller than this threshold value, the non-zero image density value associated with the subsequent process colour (yellow) is added to $D_T$ (32 in FIG. 3). Again $D_T$, which now equals 95, is compared (33 in FIG. 3) with the same corresponding threshold value of the associated raster, being 159. Still the value of $D_T$ does not exceed this threshold value. As this process colour is the last one in the sequence, no image dot is formed in the second layer for this pixel.

In theory, by employing the simplified process flow of this example, it is possible to obtain two image dots of the same process colour upon each other. However, in practical embodiments, proper care is taken in order to avoid this while ensuring that the ratios between the area coverage fractions of the respective process colours rendered in multiple layers are not affected and that the appropriate amount of each colour is rendered.

Figure 6:
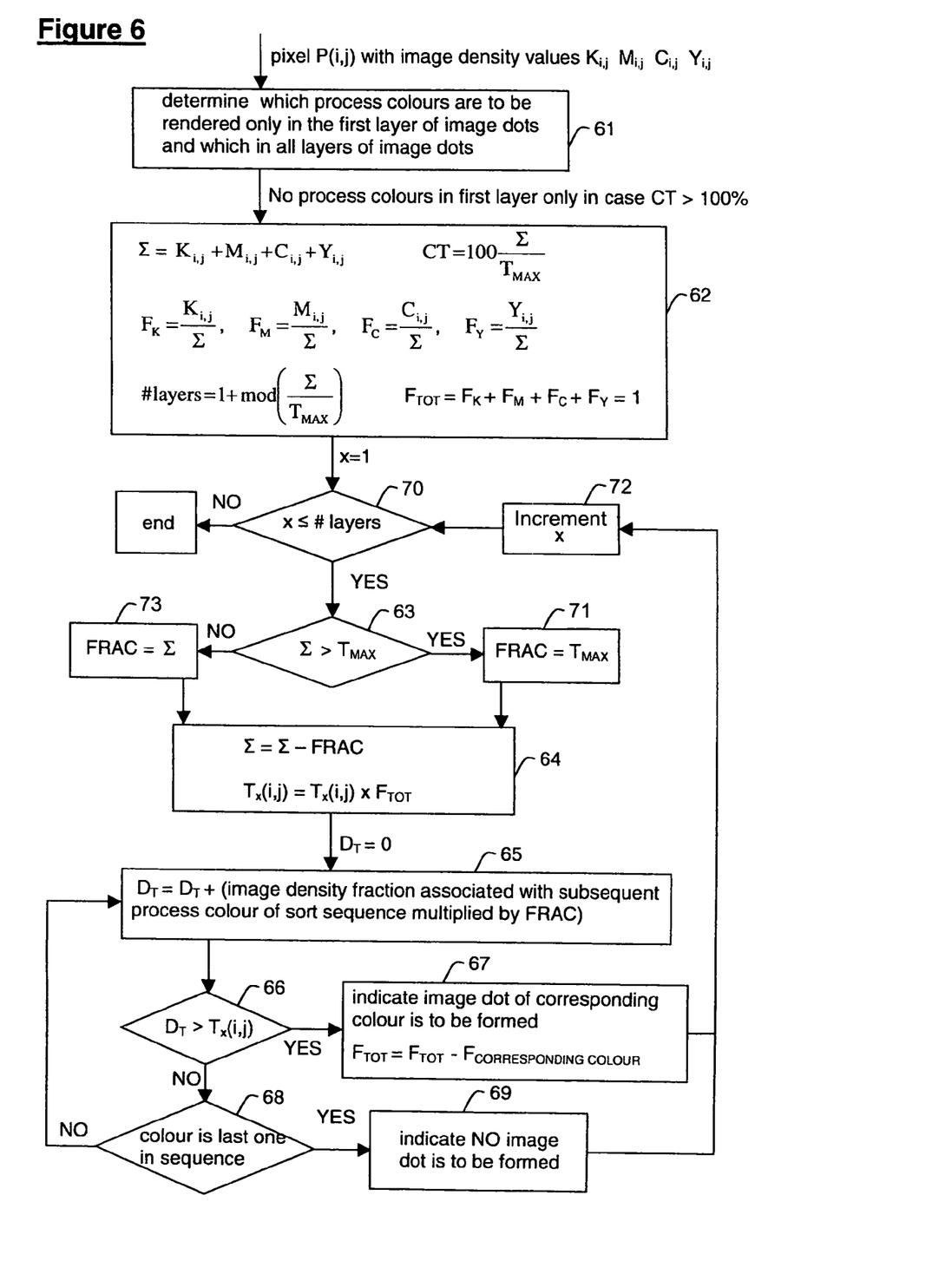
FIG. 6 depicts, according to an embodiment of the present invention, a schematic process flow of image processing steps performed on the image signals associated with a pixel of a digital image for the conversion to printing signals.

Further according to another embodiment of the present invention, FIG. 6 shows an implementation of how the image signals associated with an image part having the size of a single pixel are converted to printing signals for forming (a) layer(s) of image dots of marking particles dependent on the value of CT. According to the present invention, in order to have a beneficial effect on the colour balance of the reproduced image, it is aimed to perform the halftoning such that the variation from layer to layer of the ratios between the area coverage fractions values of at least two process colours is minimized. Therefore, it is determined which process colours are to be rendered only in the first layer of image dots and which process colours are to be rendered in all layers (61). In the implementation as of FIG. 6, all process colours, being in this case black, magenta, cyan and yellow, are to be rendered in all layers. The sum, $\Sigma$, of all image density values associated with the pixel is determined in order to calculate the total area coverage value, CT, the respective process colour fractions and the number of layers required to render the pixel (62). Each layer has an associated screen, i.e. a raster of a repetitive matrix structure including threshold values. In case multiple layers are required to render the pixel, i.e. when CT exceeds 100%, the respective matrix structures associated with the respective layers are different from one another. Although not required, for reasons of simplicity, the maximum threshold value, $T_{MAX}$, of the matrix structure is assumed to be identical for the respective screens associated with the respective layers.

Let us assume by means of example that CT exceeds 100%. Starting with the first layer (70), it is determined (63) whether $\Sigma$ exceeds $T_{MAX}$ or not. As CT exceeds 100%, indeed $\Sigma > T_{MAX}$ and thus the variable FRAC is set to equal to $T_{MAX}$(71). If $\Sigma$ does not exceed $T_{MAX}$, the FRAC is set to equal to $\Sigma$ (73). As indicated in the flowchart represented in FIG. 6, $\Sigma$ is set equal to $\Sigma$-FRAC (64) to enable the calculation of FRAC for the subsequent layer, if any. Furthermore the threshold values of the dither matrix for layer x, $T_x(i,j)$ are set equal to $T_x(i,j)$ multiplied with $F_{TOT}$ (64) to enable compensation in the subsequent layers, if any, for the fact that a coloured dot of a particular colour has been formed in any previous layer. The variable FRAC is introduced in order to facilitate the division of the image density values of the respective colours associated with the pixel over the respective layers. After the image density values associated with the pixel are sorted, it is determined whether an image dot of marking particles is to be formed and if so, which process colour is to be used. This can be done as follows. An overall image density value for the pixel, $D_T$, is defined (65). At start, $D_T$ equals image density fraction associated with the first process colour in the sequence of process colours corresponding to the first layer. This image density fraction is determined as the product of the area coverage fraction of the corresponding process colour and FRAC. Doing so has the advantage that the ratios between the image density fractions of the process colours within each layer are about the same. As the first process colour is black, $D_T = F_K \times FRAC$. Each layer has an associated raster composed of a repetitive pattern of a two-dimensional matrix structure. Within each layer, the same raster is used for each process colour. $D_T$ is compared (66) with the corresponding threshold value of the associated raster, $T_{x\,i,j}$.

When the value of $D_T$ exceeds this threshold value, it is indicated (67) that an image dot of marking particles of the corresponding colour, in casu black, is to be formed. When the value of $D_T$ is equal to or smaller than this threshold value (66), it is determined whether the process colour is the last one in the sequence (68). As the process colour is black, this is not yet the case. Therefore the image density fraction associated with the subsequent process colour (magenta) is added to $D_T$ (65). Again $D_T$ is compared (66) with the same corresponding threshold value of the associated raster. When the value of $D_T$ exceeds this threshold value, it is indicated that an image dot of marking particles of the corresponding colour, in casu magenta, is to be formed, when not, the image density fraction of the subsequent process colour, cyan, is added to $D_T$. This sequence of steps is repeated till either it is indicated that an image dot of the corresponding colour is to be formed (67) or the last process colour in the sequence is reached (68) without having exceeded the threshold value. Then the process proceeds to steps 72 and 70 and subsequent steps. In the latter case (68), it is indicated (69) that no image dot of marking particles is to be formed.

As in this example, it is supposed that CT exceeds 100%, for a particular process colour, dependent on the threshold value and values of the respective image density fractions. It is indicated that an image dot is to be formed. $F_{TOT}$, being the sum of all area coverage fractions of all process colours associated with the pixel, is subsequently corrected (67) for the fact that a particular coloured dot will be formed.

When processing the second or subsequent layer (72, 70), again it is determined for each layer whether the new value of $\Sigma$ exceeds $T_{MAX}$(63), or in other words, e.g. in case of a second layer whether CT exceeds 200% or e.g. in case of a third layer whether CT exceeds 300%. In order to determine whether an image dot of marking particles for the respective layer is to be formed and if so, which process colour is to be used, $D_T$ is set to equal to the image density fraction associated with the first process colour in the sequence of process colours corresponding to the second or any following layer. It is, however, prevented that an image dot of a process colour which will be rendered in (a) preceding layer(s) can be formed at the same pixel position.

Then $D_T$ is compared with the threshold value corresponding to the pixel position (i,j) in the screen associated with the second layer or any following layer. The screen associated with the second or any following layer is a raster of a repetitive matrix structure including threshold values, wherein this matrix structure is different from the matrix structure of the screen associated with the first layer. The threshold value ($T_x(i,j)$) corresponding to the pixel position (i,j) in the screen associated with the second or any following layer is, however, multiplied with the corrected $F_{TOT}$. In particular, the threshold value is lowered, thereby increasing the chance that an image dot of a process colour different from the colour(s) rendered in the preceding layers(s) will be rendered in (a) subsequent layer(s). Doing so advantageously takes into account the effect of process colours which will be rendered in preceding layers on the amount of colour to be rendered and ensures that the proper amount of colour will be effectively be rendered.

The processing steps of the present invention are implementable using existing computer programming language. Such computer program(s) may be stored in memories such as RAM, ROM, PROM, etc. associated with computers. Alternatively, such computer program(s) may be stored in a different storage medium such as a magnetic disc, optical disc, magneto-optical disc, etc. Such computer program(s) may also take the form of a signal propagating across the Internet, extranet, intranet or other network and arriving at the destination device for storage and implementation. The computer programs are readable using a known computer or computer-based device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for image processing a digital multi-colour image, the method comprising the steps of:
   generating from said digital multi-colour image, image signals for a selection of process colours, each image signal being associated with a digital separation image of a process colour of said selection of process colours and specifying for each pixel of said digital multi-colour image an image density value for the associated process colour; and
   adding up, for each image part of said digital multi-colour image, the image density values of all said process colours of the pixels of the image part in order to determine for each said image part a total area coverage value (CT),
   wherein, if the total area coverage value of an image part exceeds 100%, the method further comprises the following steps:

a) dividing image density values of pixels of the image part specified by the image signals, into first image density values associated with a first layer of image dots of marking particles and at least second image density values associated with a second and any following layer of image dots of marking particles such that the sum of said at least second image density values corresponds to an area coverage value equal to CT-100%, and b) converting the image signals by using a matrix-dither technique into corresponding first printing signals and at least corresponding second printing signals, each printing signal indicating for each pixel of the image part whether an image dot of marking particles of the corresponding process colour is to be formed, said matrix-dither technique being such that each of the first printing signals is built up from a raster of a first two-dimensional matrix structure by thresholding said first image density values, while each of the second printing signals is built up from a raster of a second two-dimensional matrix structure different from said first two-dimensional matrix structure, by thresholding said second image density values.

2. The method as recited in claim 1, wherein at least two process colours have non-zero second image density values.

3. The method as recited in claim 2, further comprising the step of:
determining a first area coverage fraction of a first process colour of said at least two process colours based on the associated first image density values, and a second area coverage fraction of said first process colour based on the associated second image density values.

4. The method as recited in claim 3, further comprising the step of:
determining a first area coverage fraction of a second process colour of said at least two process colours based on the associated first image density values, and a second area coverage fraction of said second process colour based on the associated second image density values.

5. The method as recited in claim 4, wherein the dividing (a) is such that a ratio between the first area coverage fraction of the first process colour and the first area coverage fraction of the second process colour differs less than 5% from a ratio between the second area coverage fraction of the first process colour and the second area coverage fraction of the second process colour.

6. The method as recited in claim 1, wherein the dividing (a) is such that a pixel has only an associated non-zero second image density value if the sum of image density values associated with said pixel is greater than the maximum threshold value of said first matrix structure.

7. The method as recited in claim 6, further comprising the step of:
selecting at least one process colour which is rendered in the first layer only.

8. The method as recited in claim 1, further comprising the step of:
sorting the image density values associated with each pixel such that the process colours are ordered with decreasing contrast value.

9. The method as recited in claim 1, wherein the image part comprises a single pixel.

10. An image processing system for processing a digital multi-colour image, the system comprising:
a generation module for generating from said digital multi-colour image, image signals for a selection of process colours, each image signal being associated with a digital separation image of a process colour of said selection of process colours and specifying for each pixel of said digital multi-colour image an image density value for the associated process colour;

an analysis module for adding up, for each image part of said digital multi-colour image, the image density values of all said process colours of the pixels of the image part in order to determine for each said image part a total area coverage value (CT), and, if the total area coverage value of an image part exceeds 100%, for dividing image density values of pixels of the image part specified by the image signals, into first image density values associated with a first layer of image dots of marking particles and at least second image density values associated with a second and any following layer of image dots of marking particles such that the sum of said at least second image density values corresponds to an area coverage value equal to CT-100%; and a conversion module for converting, if CT exceeds 100%, the image signals by using a matrix-dither technique into corresponding first printing signals and at least corresponding second printing signals, each printing signal indicating for each pixel of the image part whether an image dot of marking particles of the corresponding process colour is to be formed, said matrix-dither technique being such that each of the first printing signals is built up from a raster of a first two-dimensional matrix structure by thresholding said first image density values, while each of the second printing signals is built up from a raster of a second two-dimensional matrix structure different from said first two-dimensional matrix structure, by thresholding said second image density values.

11. The image processing system as recited in claim 10, wherein at least two process colours have non-zero second image density values.

12. The image processing system as recited in claim 11, wherein the analysis module determines a first area coverage fraction of a first process colour of said at least two process colours based on the associated first image density values, and a second area coverage fraction of said first process colour based on the associated second image density values, and a first area coverage fraction of a second process colour of said at least two process colours based on the associated first image density values, and a second area coverage fraction of said second process colour based on the associated second image density values, wherein the dividing is such that a ratio between the first area coverage fraction of the first process colour and the first area coverage fraction of the second process colour differs less than 5% from a ratio between the second area coverage fraction of the first process colour and the second area coverage fraction of the second process colour.

13. The image processing system as recited in claim 10, wherein the analysis module divides such that a pixel has only an associated non-zero second image density value if the sum of image density values associated with said pixel is greater than the maximum threshold value of said first matrix structure.

14. The image processing system as recited in claim 13, wherein the generation module selects at least one process colour which is rendered in the first layer only.

15. The image processing system as recited in claim 10, wherein the image part comprises a single pixel.

16. A computer program product embodied on at least one computer-readable medium, for image processing a digital multi-colour image, the product comprising computer-executable instructions for:

generating from said digital multi-colour image, image signals for a selection of process colours, each image signal being associated with a digital separation image of a process colour of said selection of process colours and specifying for each pixel of said digital multi-colour image an image density value for the associated process colour; and adding up, for each image part of said digital multi-colour image, the image density values of all said process colours of the pixels of the image part in order to determine for each said image part a total area coverage value (CT), wherein, if the total area coverage value of an image part exceeds 100%, the product further comprising computer-executable instructions for:

(a) dividing image density values of pixels of the image part specified by the image signals, into first image density values associated with a first layer of image dots of marking particles and at least second image density values associated with a second and any following layer of image dots of marking particles such that the sum of said at least second image density values corresponds to an area coverage value equal to CT-100%, and (b) converting the image signals by using a matrix-dither technique into corresponding first printing signals and at least corresponding second printing signals, each printing signal indicating for each pixel of the image part whether an image dot of marking particles of the corresponding process colour is to be formed, said matrix-dither technique being such that each of the first printing signals is built up from a raster of a first two-dimensional matrix structure by thresholding said first image density values, while each of the second printing signals is built up from a raster of a second two-dimensional matrix structure different from said first two-dimensional matrix structure, by thresholding said second image density values.

17. The computer program product as recited in claim 16, wherein at least two process colours have non-zero second image density values.

18. The computer program product as recited in claim 17, further comprising computer-executable instructions for:

determining a first area coverage fraction of a first process colour of said at least two process colours based on the associated first image density values, and a second area coverage fraction of said first process colour based on the associated second image density values, and a first area coverage fraction of a second process colour of said at least two process colours based on the associated first image density values, and a second area coverage fraction of said second process colour based on the associated second image density values, wherein the dividing is such that a ratio between the first area coverage fraction of the first process colour and the first area coverage fraction of the second process colour differs less than 5% from a ratio between the second area coverage fraction of the first process colour and the second area coverage fraction of the second process colour.

19. The computer program product as recited in claim 16, wherein the dividing is such that a pixel has only an associated non-zero second image density value if the sum of image density values associated with said pixel is greater than the maximum threshold value of said first matrix structure.

20. The computer program product as recited in claim 16, further comprising computer-executable instructions for:

sorting the image density values associated with each pixel such that the process colours are ordered with decreasing contrast value.

* * * * *